(No Model.)
R. W. SOPER.
CURVE FOR CASH CARRIER APPARATUS.
No. 432,576. Patented July 22, 1890.
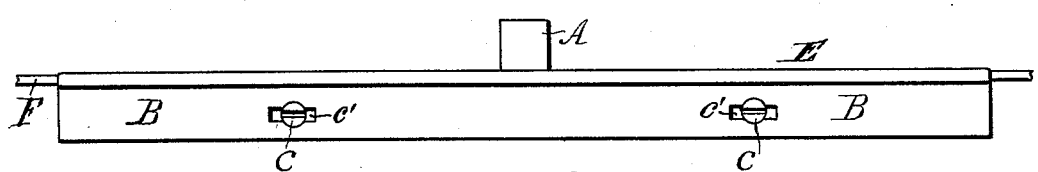
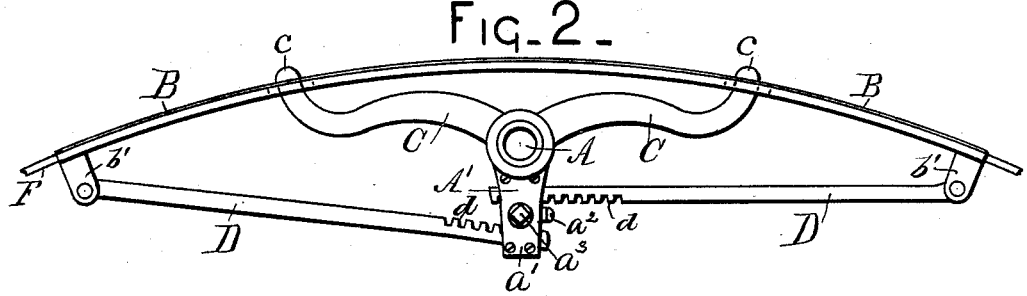
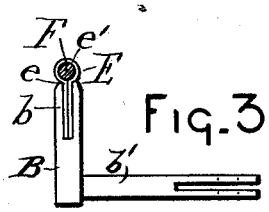
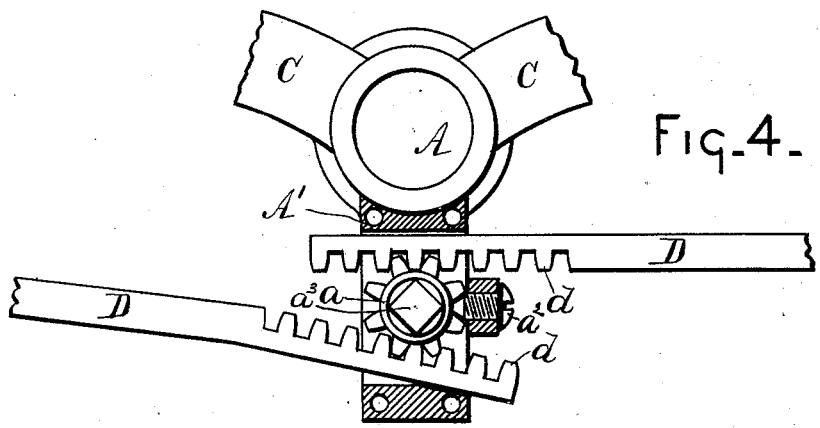
WITNESSES
C. J. Shipley
L. A. Dvelty
INVENTOR
Robert W. Soper
By Wells W. Leggett & Co.
Attorneys.

UNITED STATES PATENT OFFICE.

ROBERT W. SOPER, OF DETROIT, MICHIGAN, ASSIGNOR OF PART, BY DIRECT AND MESNE ASSIGNMENTS, TO MARY HAYES, JEREMIAH DWYER, JAMES DWYER, GEORGE H. BARBOUR, C. A. DU CHARME, AND W. J. KEEP, ALL OF SAME PLACE.

CURVE FOR CASH-CARRIER APPARATUS.

SPECIFICATION forming part of Letters Patent No. 432,576, dated July 22, 1890.

Application filed October 7, 1889. Serial No. 326,243. (No model.)

*To all whom it may concern:*

Be it known that I, ROBERT W. SOPER, a citizen of the United States, residing at Detroit, county of Wayne, State of Michigan, have invented a certain new and useful Improvement in Track-Curves for Cash-Carrier Apparatus; and I declare the following to be a full, clear, and exact description of the same, such as will enable others skilled in the art to which it pertains to make and use the same, reference being had to the accompanying drawings, which form a part of this specification.

My invention is designed to produce a track-curve for a cash-carrier apparatus which shall be capable of adjustment, whereby more or less of an angle may be turned, as desired, and mechanism whereby this adjustment may be accomplished easily and yet accurately.

It also consists in other novel features hereinafter described and claimed.

In the drawings, Figure 1 is a side elevation, and Fig. 2 is a plan view, of my track-curve. Fig. 3 is an end elevation, and Fig. 4 is a detail, of the standard-socket with adjacent parts in section.

In carrying out my invention, A represents the standard-socket, and B the curved track-section.

C are arms rigidly engaged to the standard-socket and extending to the curved track-section, where their ends enter small horizontal slots C′ in the track-section, and are movably held therein by any suitable means— as, for instance, the screws c.

D are rods, which are pivotally engaged to lugs b′ on the curved track-section beyond the points where the arms are engaged and extend back adjacent to the standard-socket. A projection A′ on the back of the standard-socket supports gearing—such as a small cog-wheel a—and the ends of the rods D are provided with teeth d, which mesh with the teeth of the cog. The teeth d, meshing with the cog—one set on each side—are held in place by the plate a′. When the cog is revolved, the rods will be simultaneously moved and the ends of the curved track-section be either drawn toward or from each other, thus giving the curved track-section the desired curve, and the cog may be locked by the set-screw $a^2$. A stem may project up from the cog and be provided with a squared head $a^3$ to facilitate the revolving of the cog by means of a wrench or other tool. By thus supporting the curved track-section by arms which are not rigidly engaged to it and by adjusting the curve by attaching-rods or equivalents to the ends of the curved track-section a much more accurate curve is obtained than has heretofore been accomplished.

Chains or wire might be used instead of the rods D, and by the term "rods" I would be understood as including any such well-known equivalents.

Another feature of my invention is supporting the wire by means of a curved track-section. It will be observed that the upper edge b of the curved track-section is slotted, as shown in Fig. 3.

E is a thin strip of metal bent in a circular form to embrace the wire, and its edges are brought together at e. These edges are inserted into the slot in the upper edge of the curved track-section and may be riveted in place. The wire F can then be inserted in the circular portion e′ and a smooth way obtained around the curve. By this means the wire is supported much more steadily, there is no incline onto which the car must run when passing around the curve, and the wire is supported exactly in center of the curved track-section.

What I claim is—

1. An adjustable curve for a cash-carrier apparatus, consisting of a curved track-section movably supported by arms, rods pivotally engaged to the ends of said section and to the standard-socket, and gearing for simultaneously lengthening and shortening said rods and thus varying the curvature of the curved track-section, substantially as described.

2. An adjustable curve for a cash-carrier apparatus, consisting of a curved track-section movably supported by arms, rods pivotally engaged at their outer ends to the ends of the curved track-section and having their inner ends provided with a series of teeth, and a cog-wheel supported on the standard-socket and meshing with the teeth on the rods, whereby the rods may be simultaneously lengthened and shortened at will, substantially as described.

3. An adjustable curve for a cash-carrier apparatus, consisting of a curved track-section having in its upper edge a longitudinal slot, a strip of metal bent to receive the wire and having the edges of said strip brought together and secured in the slot in the upper edge of the track-section, whereby the wire and its casing project above the curved wire-section, rods engaged with the ends of said track-section, and gearing for simultaneously lengthening or shortening both of said rods to vary the curvature of the track-section, substantially as described.

In testimony whereof I sign this specification in the presence of two witnesses.

ROBERT W. SOPER.

Witnesses:
A. J. BENES,
W. H. CHAMBERLIN.